(12) United States Patent
Crombez (10) Patent No.: US 8,482,255 B2
(45) Date of Patent: Jul. 9, 2013

(54) METHOD AND SYSTEM FOR CHARGING AN AUXILARY BATTERY IN A PLUG-IN ELECTRIC VEHICLE

(75) Inventor: Dale Scott Crombez, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 329 days.

(21) Appl. No.: 12/869,288

(22) Filed: Aug. 26, 2010

(65) Prior Publication Data
US 2012/0049792 A1    Mar. 1, 2012

(51) Int. Cl.
*H02J 7/00* (2006.01)

(52) U.S. Cl.
USPC .......................................... 320/132; 320/109

(58) Field of Classification Search
USPC ................ 320/103, 104, 138, 109, 128, 132, 320/137
See application file for complete search history.

(56) References Cited

U.S. PATENT DOCUMENTS

| 5,633,577 | A | 5/1997 | Matsumae et al. |
| 6,963,186 | B2 | 11/2005 | Hobbs |
| 7,740,092 | B2 * | 6/2010 | Bender ....................... 180/65.29 |
| 8,403,086 | B1 * | 3/2013 | Free et al. .................. 180/65.21 |
| 2006/0214637 | A1 | 9/2006 | Gonzales et al. |
| 2007/0068714 | A1 | 3/2007 | Bender |

FOREIGN PATENT DOCUMENTS

| JP | 7123510 A | 5/1995 |
| JP | 8317575 A | 11/1996 |
| JP | 9019068 A | 1/1997 |
| JP | 10322806 A | 12/1998 |

* cited by examiner

*Primary Examiner* — Richard V Muralidar
(74) *Attorney, Agent, or Firm* — David B. Kelley; Brooks Kushman P.C.

(57) ABSTRACT

A system and method is provided for charging an auxiliary battery in a plug-in electric vehicle with an onboard charging system. The auxiliary battery has a predetermined operating range of charge levels. The auxiliary battery is charged to an upper charge level using an external power source thereby reducing energy used from the onboard charging system to charge the auxiliary battery during a drive mode of the vehicle. The upper charge level may be substantially similar to an upper level of the predetermined operating range of charge levels or greater than the predetermined operating range of charge levels. The auxiliary battery may be allowed to discharge to a lower charge level, which may be substantially similar to a lower level of the predetermined operating range of charge levels or less than the predetermined operating range of charge levels.

18 Claims, 4 Drawing Sheets

METHOD AND SYSTEM FOR CHARGING AN AUXILARY BATTERY IN A PLUG-IN ELECTRIC VEHICLE

BACKGROUND

1. Technical Field

Charging an auxiliary battery in a plug-in electric vehicle using a power supply external to the vehicle.

2. Background Art

A hybrid electric vehicle (HEV) generally includes a high-voltage storage battery, a secondary battery, a combustion engine, and an electric motor. The high-voltage storage battery has a state of charge (SOC). However, the SOC of the battery decreases when the high-voltage storage battery provides electric power for the vehicle. For example, the SOC of the high-voltage storage battery decreases when providing electric power to the electric motor to drive traction wheels on the vehicle. In such an example, the electric power stored in the high-voltage storage battery decreases and the electric-only driving range of the HEV is reduced.

The secondary or auxiliary battery operates at a lower voltage than the high-voltage storage battery, such as 12-volts. The secondary battery can provide electric power to drive various low-voltage loads in the HEV. However, the amount of electric charge in the secondary battery decreases when driving various loads in the HEV. Consequently, the secondary battery may need to be recharged by transferring electric power from energy stored on the vehicle to the secondary battery. Such stored energy may be in the form of electrical energy stored in the high-voltage storage battery or from stored fuel that is converted by an engine-driven generator to electrical energy and transferred to the secondary battery. However, using stored onboard energy to recharge the secondary battery can reduce the driving range and overall efficiency of the HEV.

SUMMARY

Various embodiments of a system or method are provided for charging an auxiliary battery in a plug-in electric vehicle using an external power source. In addition, at least one logic storage medium is provided having logic-device-readable code embodied thereon for performing the method of charging the auxiliary battery in the plug-in electric vehicle. The auxiliary battery has a predetermined operating range of charge levels. The predetermined operating range for the auxiliary battery may be a voltage range, such as between 11 volts and 13 volts.

An upper charge level may be determined. The upper charge level may be approximately an upper level of the predetermined operating range of charge levels. Alternatively, the upper charge level may be greater than the predetermined operating range of charge levels. The upper charge level may be a charge level between 12 volts and 15 volts. Furthermore, the upper charge level may be a predetermined maximum charge of the auxiliary battery. The auxiliary battery is allowed to be charged to the upper charge level using an external power source thereby reducing energy used from an onboard charging system in the vehicle to charge the auxiliary battery during a drive mode of the vehicle.

The system includes at least one logic device. The logic device determines the upper charge level and charges the auxiliary battery to the upper charge level using an external power source. The logic device may be a controller that includes a processor operable to execute software instructions, a computer memory operable to store software instructions accessible by the processor, and a set of software instructions stored in the memory to determine the upper charge level and to charge the auxiliary battery.

The method includes charging the auxiliary battery to the upper charge level using the external power source thereby reducing energy used from the onboard charging system. The method may include determining parameters of the auxiliary battery to obtain the predetermined operating range of charge levels.

The method may include charging a high-voltage battery in the vehicle to a predetermined charge level before using the external power source to charge the auxiliary battery greater than the predetermined operating range of charge levels. In addition, the method may include charging the high-voltage battery using the external power source while charging the auxiliary battery to the upper charge level.

The method may include allowing the auxiliary battery to discharge to a lower charge level during the drive mode of the vehicle. The auxiliary battery may be allowed to discharge from the upper charge level to the lower charge level. The lower charge level may be less than the predetermined operating range of charge levels of the auxiliary battery. Alternatively, the lower charge level may be approximately a lower level of the predetermined operating range of charge levels. The auxiliary battery may be allowed to obtain the lower charge level while limiting energy usage from the onboard charging system to charge the auxiliary battery.

The lower charge level may be determined based on operating parameters of the auxiliary battery, a time that the vehicle is predicted to be in an off state, a predicted time until next charge of the auxiliary battery, or a combination thereof. The predicted time until next charge may be based on when the onboard charging system in the vehicle is predicted to provide power for charging the auxiliary battery. Furthermore, the predicted time until next charge may be based on when the auxiliary battery is predicted to be charged with power from the external power source.

The method may include charging the auxiliary battery to an intermediate charge level with power generated from the onboard charging system in the vehicle. The intermediate charge level is within the predetermined operating range of charge levels of the auxiliary battery.

DETAILED DESCRIPTION

Embodiments of the present disclosure generally provide a method and system for charging an auxiliary battery in a plug-in electric vehicle using an external power source.

Figure 1:
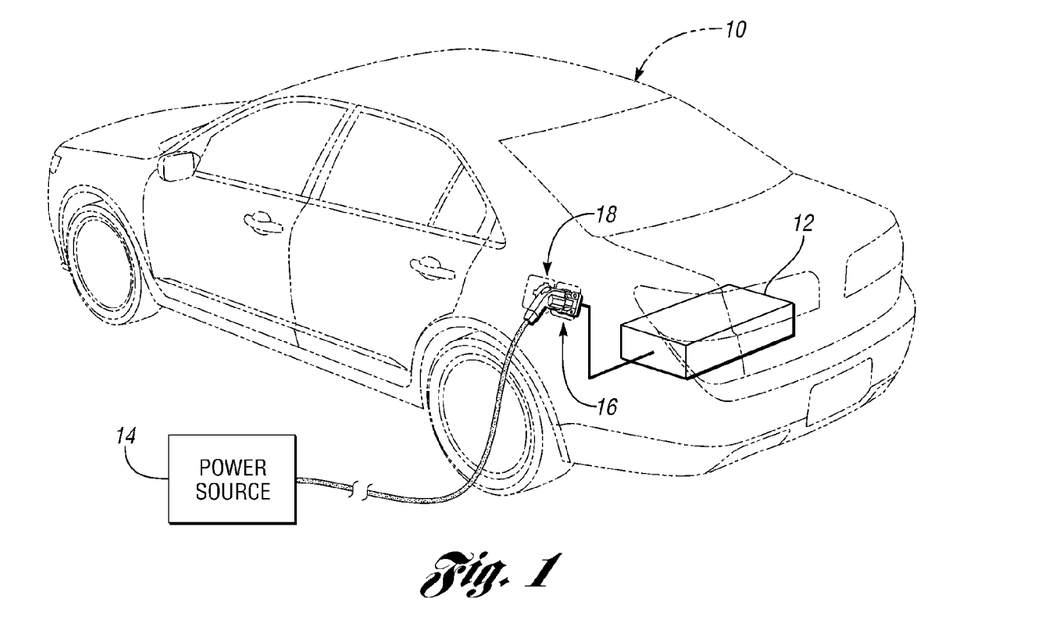
FIG. 1 is a schematic diagram illustrating a plug-in electric vehicle with an onboard charging system in accordance with one embodiment.

With reference to FIG. 1, a plug-in electric vehicle 10 (hereinafter "vehicle") is provided. The vehicle 10 may be any type of electric vehicle that can be plugged into a power source 14 that is external to the vehicle 10 (hereinafter "external power source"), such as a plug-in electric vehicle, a plug-in hybrid electric vehicle (PHEV), a battery electric vehicle (BEV), a pure electric vehicle, etc. The plug-in vehicle 10 of FIG. 1 includes an onboard charging system 12. It should be understood that the term "plug-in vehicle" includes any type of automotive vehicle that can connect to the external power source 14 to receive electric power from the external power source 14. Thus, for example, the vehicle 10 may be a vehicle that includes a charge port 16 to receive a charge plug 18 and to transfer electric power from the external power source 14, which may be a public utility grid, through the charge plug 18 and into the vehicle 10.

The external power source 14 provides electric power for the vehicle 10. The external power source 14 may be a charging station or a standard household electrical outlet that is electrically connected to the GRID. The GRID steps down electric power from a high voltage, such as 7,200 volts, to a lower voltage, such as 240 volts.

With continuing reference to FIG. 1, the external power source 14 may be a direct current (DC) power source and/or an alternating current (AC) power source. For example, the external power source 14 may be a 120-volt AC power outlet or 240-volt AC power outlet. In another example, the external power source 14 may be a 300-volt DC power outlet.

Figure 2:
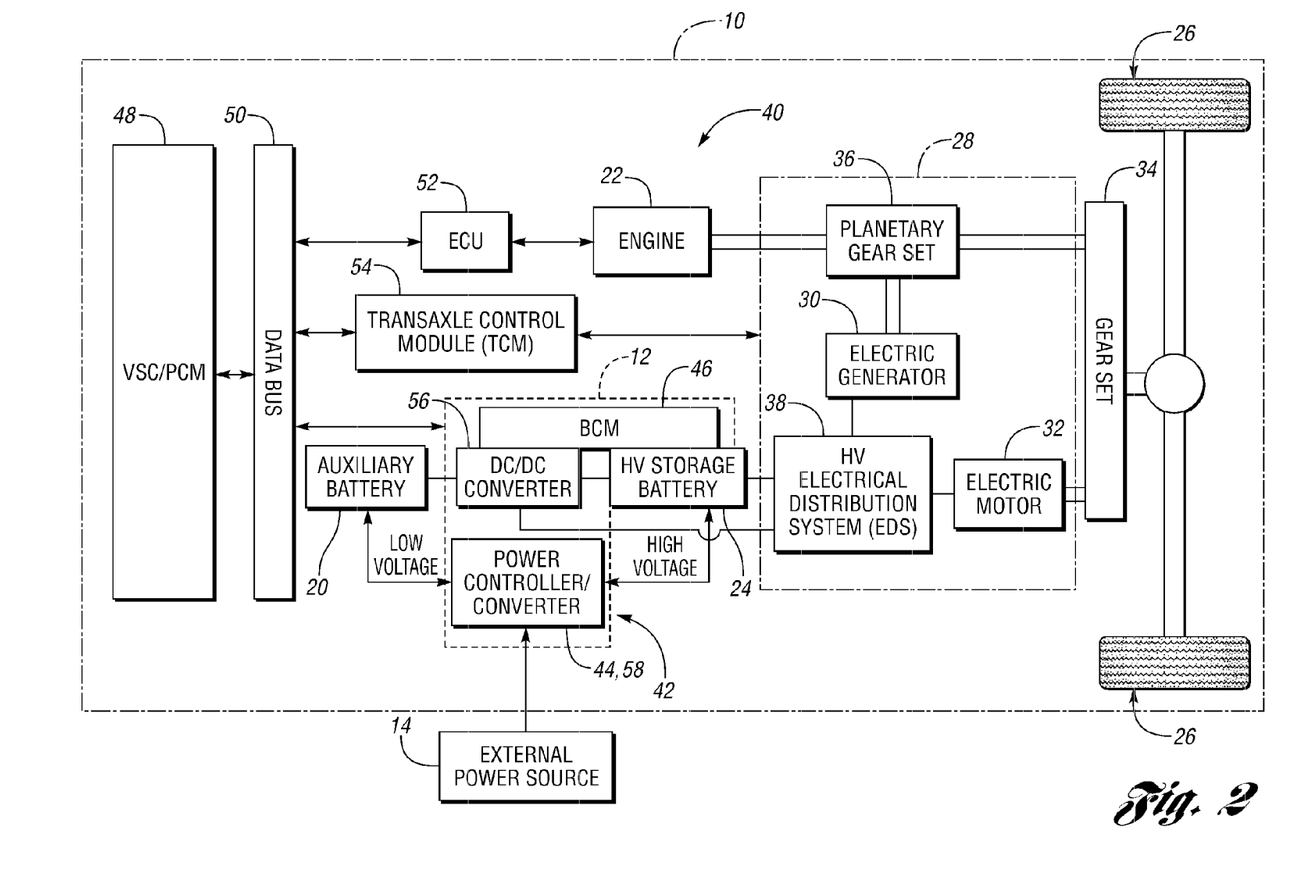
FIG. 2 is a schematic diagram illustrating a system including at least one logic device for charging an auxiliary battery in the plug-in electric vehicle in accordance with one embodiment.

As shown in FIG. 2, the vehicle 10 includes an auxiliary battery 20, such as a low-voltage storage battery. The auxiliary battery 20 may be a 12-volt battery that stores or outputs electric power to various low-voltage components in the vehicle 10. Likewise, the auxiliary battery 20 may be a "start, light, and ignition" (SLI) battery that outputs DC electric power to various low-voltage loads in the vehicle 10 that operate on low-voltage DC power.

Figure 3:
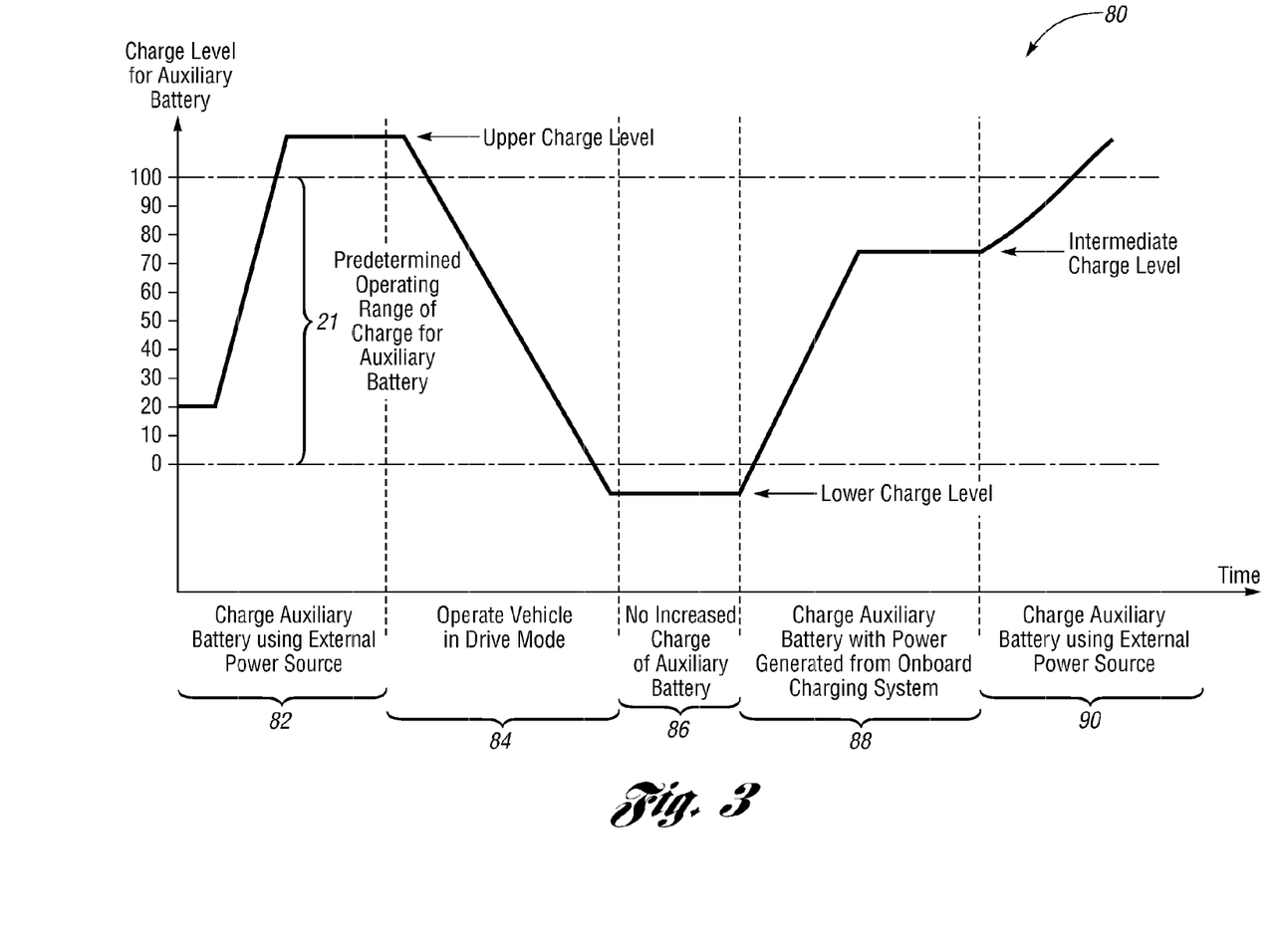
FIG. 3 is a charge level diagram illustrating an amount of electric change in the auxiliary battery at different times in accordance with one embodiment.

With reference to FIG. 3, the auxiliary battery 20 has a predetermined operating range 21 of charge levels. In one example, the predetermined operating range 21 for the auxiliary battery 20 may be a voltage range, such as between eleven volts (11V) and thirteen volts (13V). The voltage range for the auxiliary battery 20 may be an open circuit voltage across the auxiliary battery 20. For example, the open circuit voltage may be between 11.8V and 12.6V.

With continuing reference to FIG. 3, the operating range 21 of charge levels may be a nominal capacity range of the auxiliary battery 20. The nominal capacity range indicates an amount of electric charge that the auxiliary battery 20 normally provides during a drive mode of the vehicle 10.

The operating range 21 of the auxiliary battery 20 may be predefined by a manufacture of the auxiliary battery 20. For example, the operating range 21 may be based on nominal values that are defined by a manufacture of the auxiliary battery 20 and stored in memory. Alternatively, one or more systems in the vehicle 10 may determine battery parameters of the auxiliary battery 20 to determine the operating range 21 of the auxiliary battery 20. The battery parameters can be used to identify a particular type of auxiliary battery 20 as well as its operating characteristics. Thus, the operating range 21 of the auxiliary battery 20 may change for a drive cycle of the vehicle 10 when operating characteristics of the auxiliary battery 20 change. For example, operating characteristics of the auxiliary battery 20 may change with increasing number of charge cycles of the auxiliary battery 20 or when charging the auxiliary battery 20 using electric power from the external power source 14.

As illustrated in FIG. 3, the predetermined operating range 21 may define a scale of charge levels from 0 to 100. The auxiliary battery 20 may be charged above the 100 charge level using electric power from the external power source 14.

Furthermore, the auxiliary battery 20 may be allowed to deplete below the 0 charge level during the drive mode of the vehicle 10.

Referring again to FIG. 2, the vehicle 10 includes an engine 22, a high-voltage storage battery 24 (hereinafter "HV battery"), and drive wheels 26. The HV battery 24 may provide 300-volt DC power. The engine 22 and the HV battery 24 selectively provide power to the drive wheels 26 so that the vehicle 10 can be propelled. In operation, the HV battery 24 stores or outputs electric power to various components in the vehicle 10. For example, the HV battery 24 may receive electric power from an electric generator 30, output electric power to an electric motor 32, and/or power other electric-based devices in the vehicle 10.

Being a device that can store electric energy, the HV battery 24 has a state of charge (SOC). When the HV battery 24 is recharging from the external power source 14, the HV battery 24 receives electric power from the external power source 14 and the SOC of the HV battery 24 increases.

As shown in FIG. 2, the vehicle 10 includes a transaxle 28. The transaxle 28 is analogous to a transmission in a conventional vehicle. The transaxle 28 includes the electric generator 30, the electric motor 32, a power transfer gear set 34, and a planetary gear set 36. The transaxle 28 is disposed between the drive wheels 26 and the engine 22 and the HV battery 24 to effectuate power transfer to the drive wheels 26. The electric motor 32 and the electric generator 30 are two electric machines that make up an electric machine arrangement.

With continuing reference to FIG. 2, the planetary gear set 36 in the transaxle 28 mechanically couples the engine 22, the drive wheels 26 through gear set 34, and the electric generator 30. For example, the electric generator 30 may be connected to a sun gear of the planetary gear set 36 while the engine 22 and the drive wheels 26 are respectively connected to the planetary carrier and the ring gear of the planetary gear set 36.

As depicted in FIG. 2, the vehicle 10 may include a high-voltage electrical distribution system 38 (hereinafter "EDS"). The EDS 38 can receive the electric energy from the electric generator 30 and distribute the electrical energy between the HV battery 24 and the electric motor 32 depending on the driving mode of the vehicle 10. The EDS 38 can also receive electric energy from the HV battery 24 and/or the electric motor 32 and distribute the electric energy to the onboard charging system 12, the electric motor 32, the electric generator 30, or a combination thereof.

As illustrated in FIG. 2, a system 40 is provided for charging the auxiliary battery 20 in the vehicle 10. The system 40 of FIG. 2 is shown integrated with a powertrain of a parallel/series hybrid electric vehicle (PSHEV). However, the system 40 can be integrated with any type of plug-in vehicle. For example, the vehicle 10 may be a series hybrid electric vehicle (SHEV) or a parallel hybrid electric vehicle (PHEV).

The system 40 includes at least one logic device (LC) or controller 42. The controller or LD 42 can be implemented by various types or combinations of electronic devices and/or microprocessor-based computers or controllers. To implement the method of charging the auxiliary battery 20 in the vehicle 10, the controller 42 may execute a computer program or algorithm or control logic embedded or encoded with the method and stored in volatile and/or persistent memory. Alternatively, control logic may be encoded in a logic or gate array stored on one or more integrated circuit chips. The control logic may be implemented in software, hardware, or a combination of software and hardware in one or more controllers and/or electronic devices depending upon the particular application. When implemented in software, the control logic is preferably provided in one or more computer-readable storage media having stored data representing code or instructions executed by a computer to control charging of the auxiliary battery 20. The computer-readable storage media may include one or more of a number of known physical devices which utilize electric, magnetic, optical, and/or hybrid storage to keep executable instructions and associated calibration information, operating variables, and the like.

The controller 42 of FIG. 2 is shown to include a power controller 44. Although the controller 42 is shown as a single hardware device, the controller 42 may include multiple logic devices in the form of multiple hardware devices, or multiple software logic devices within one or more hardware devices. Thus, for example, the controller 42 may include a vehicle system controller (VSC), a powertrain control module (PCM), a battery control module (BCM) 46, the power controller 44, or some combination thereof. The combination of the VSC and the PCM is hereinafter referenced as a "VSC/PCM" having reference numeral 48.

The power controller 44 of FIG. 2 is shown integrated as part of the onboard charging system 12. However, the power controller 44 may be separate from the onboard charging system 12.

As shown in FIG. 2, the VSC/PCM 48 controls a number of components or devices in the vehicle 10 through a vehicle data bus 50 (hereinafter "data bus"). For example, the VSC/PCM 48 controls the onboard charging system 12, the power controller 44, the transaxle 28 through a transaxle control module (TCM) 54, and the engine 22 through an engine control unit (ECU) 52. The data bus 50 is in communication with various components in the vehicle 10 including the BCM 46, the power controller 44, the TCM 54, and the ECU 52. The data bus 50 may be implemented as a controller area network (CAN), a local interconnect network (LIN), or any such suitable data-communication link that can transfer data between the VSC/PCM 48 and other devices in the vehicle 10.

The BCM 46 controls electric energy flow to and from the HV battery 24. For example, the BCM 46 can control when the HV battery 24 outputs and stores high-voltage electric power. For example, the BCM 46 may control a DC-to-DC converter 56 to control charging of the auxiliary battery 20 with electric power either from the HV battery 24 or from the EDS 38.

The VSC/PCM 48 and the TCM 54 operate to control the various modes of the transaxle 28, such as operation of an electric drive mode of the vehicle 10. The electric drive mode of the vehicle 10 allows the electric motor 32 to operate as a motor, as a generator to provide electric power to operate the vehicle 10, or as both. The electric drive mode of the vehicle 10 can be used to drive the drive wheels 26 and propel the vehicle 10.

With continuing reference to FIG. 2, the onboard charging system 12 can be used to charge the auxiliary battery 20 during the drive mode of the vehicle 10. In such an example when the vehicle 10 is not connected to the external power source 14, the onboard charging system 12 charges the auxiliary battery 20 using power either from the EDS 38 or directly from the HV battery 24. In addition, the onboard charging system 12 may charge the auxiliary battery 20 using power from a low-voltage electric machine (not shown). The low-voltage electric machine (not shown) does not require a voltage conversion through the DC-to-DC converter 56, but rather charges the auxiliary battery 20 directly. For example, the low-voltage electric machine may be a generator that operates between 13.5 volts and 14.5 volts, such as an alternator that is typically used on an automotive vehicle. Being a generator, the low-voltage electric machine may be coupled directly to engine 22 and coordinatively controlled within the scope of the onboard charging system 12.

Referring again to FIG. 2, the power controller 44 may include a charger or a power converter 58. While the power controller 44 and the power converter 58 are shown as a single device, the power controller 44 and the power converter 58 may operate together as separate hardware devices. The power converter 58 may include an AC/DC converter, a DC/DC converter, an AC/AC converter, or a combination thereof depending on the particular application or configuration of the power converter 58. For example, the power converter 58 may include a high-voltage AC/DC converter for charging the HV battery 24 and a low-voltage AC/DC converter for charging the auxiliary battery 20. In operation, the power converter 58 receives electric power from the external power source 14 and converts the power to a more suitable form of power for charging the auxiliary battery 20, the HV battery 24, or both batteries 20, 24.

In operation, the power converter 58 can charge the auxiliary battery 20 using electric power provided by the external power source 14. For example, the power converter 58 may charge the auxiliary battery 20 using electric power at a voltage level between 13.5 volts and 14.5 volts (13.5V-14.5V). In an alternative operation, the power converter 58 can indirectly charge the auxiliary battery 20 using electric power provided by the external power source 14 to the DC-to-DC converter 56 through the HV battery 24. For example, the power converter 58 may provide electric power at levels of 300 volts to the DC-to-DC converter 56, which in turn charges the auxiliary battery 20 at electric power levels between 13.5 volts and 14.5 volts. Using the external power source 14, the system 40 can charge the auxiliary battery 20 to a charge level which may be either substantially similar to or be approximately an upper level of the predetermined operating range 21 of charge levels or above the predetermined operating range 21 of charge levels of the auxiliary battery 20. A charge level which is either above the predetermined operating range 21 of the auxiliary battery 20, as illustrated in FIG. 3, or substantially similar to an upper level of the predetermined operating range 21 of the auxiliary battery 20 may be referred to as an upper charge level. For example, the system 40 may charge the auxiliary battery 20 to an upper charge level between 12 volts and 15 volts. In addition, the power converter 58 may charge the HV battery 24 using electric power provided by the external power source 14. The power converter 58 may charge the auxiliary battery 20 and the HV battery 24 either concurrently or sequentially depending on the charge states of the batteries 20, 24.

As illustrated in FIG. 2, the vehicle 10 includes the onboard charging system 12 to charge or recharge the auxiliary battery 20 when the vehicle 10 is not connected to the external power source 14. The onboard charging system 12 of FIG. 2 is shown to include the BCM 46, the DC-to-DC converter 56, and the power converter 58. However, the onboard charging system 12 may include fewer components. For example, the onboard charging system 12 may only include the BCM 46 and the DC-to-DC converter 56 for charging the auxiliary battery 20 using electric power from the HV battery 24, the EDS 38, or both the HV battery 24 and the EDS 38.

Figure 4:
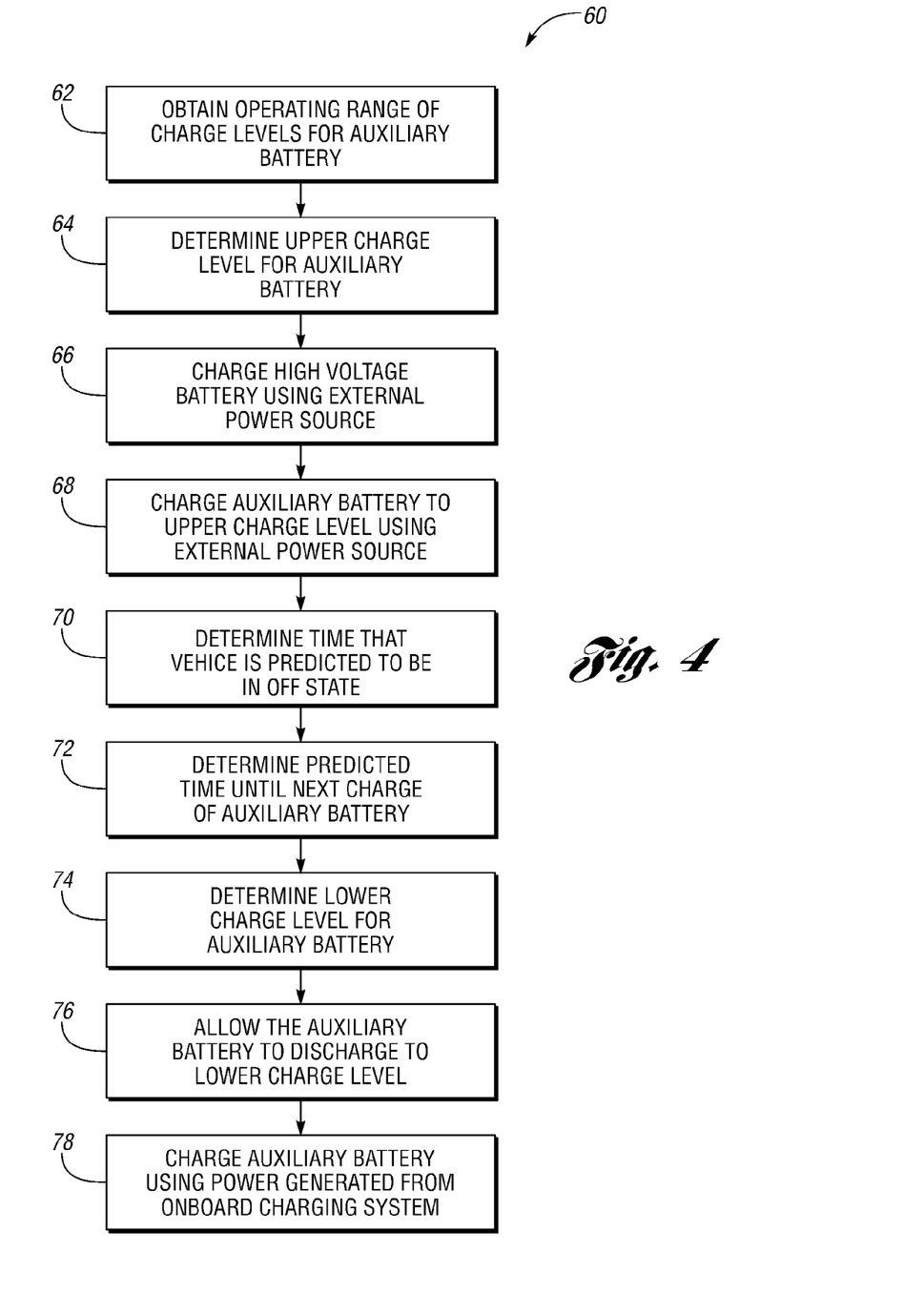
FIG. 4 is a flowchart diagram illustrating a method of charging an auxiliary battery in a plug-in electric vehicle in accordance with one embodiment.

With reference to FIG. 4, a flowchart diagram 60 is provided to illustrate operation of a system, such as system 40, or steps of a method of charging an auxiliary battery in a plug-in electric vehicle. The vehicle 10 and components illustrated in FIGS. 1-2 may be referenced throughout the discussion of the method to facilitate understanding of various aspects of the method. The diagram of FIG. 4 provides a representative control strategy for charging the auxiliary battery 20.

The control strategy or logic illustrated in FIG. 4 may be implemented by one or more logic arrays and/or a microprocessor based computer or controller. When implemented by a microprocessor based controller, the control strategy may include instructions or code processed using any of a number of known strategies such as event-driven, interrupt-driven, multi-tasking, multi-threading, and the like. Whether implemented primarily in code or hardware devices, various steps or functions illustrated may be performed in the sequence illustrated, in a difference sequence, in parallel, or in some cases omitted. Although not explicitly illustrated, one of ordinary skill in the art will recognize that one or more of the illustrated functions may be repeatedly performed depending upon the particular implementation. Similarly, the order of processing is not necessarily required to achieve the described features and advantages, but is provided for ease of illustration and description.

The control logic may be implemented in software, hardware, or a combination of software and hardware in one or more controllers and/or electronic devices depending upon the particular application. When implemented in software, the control logic is preferably provided in one or more computer-readable storage media having stored data representing code or instructions executed by a computer to control charging. The computer-readable storage media may include one or more of a number of known physical devices which utilize electric, magnetic, optical, and/or hybrid storage to keep executable instructions and associated calibration information, operating variables, and the like.

At block 62 of flowchart diagram 60, an operating range 21 of charge levels is obtained for the auxiliary battery 20. The LD or controller 42 may obtain the operating range 21 of charge levels either internally or from a signal that the controller 42 receives external to the controller 42, such as from the VSC/PCM 48 or the BCM 46.

At block 64, an upper charge level for the auxiliary battery 20 is determined. The upper charge level is either above the predetermined operating range 21 of the auxiliary battery 20, as illustrated in FIG. 3, or substantially similar to an upper level of the predetermined operating range 21 of the auxiliary battery 20. The LD or controller 42, such as the power controller 44 and/or the VSC/PCM 48, may determine the upper charge level for the auxiliary battery 20.

At block 66, the HV battery 24 is charged using electric power from the external power source 14. The power controller 44, the power converter 58, the BCM 46, or a combination thereof may be used to charge the HV battery 24 using the external power source 14. The HV battery 24 may be charged to a predetermined charge level before the external power source 14 is used to charge the auxiliary battery 20 to the upper charge level. In addition, the HV battery 24 may be charged using power from the external power source 14 while charging the auxiliary battery 20 to an upper charge level.

At block 68, the auxiliary battery 20 is charged up to the upper charge level using the external power source 14. Charging the auxiliary battery 20 up to the upper charge level, for example as shown in FIG. 3, using the external power source 14 facilitates reducing energy used from the onboard charging system 12 to charge the auxiliary battery 20 during a drive mode of the vehicle 10. Reducing energy used from the onboard charging system 12 reduces the amount of electric energy obtained from either the HV battery 24, the EDS 38, or both the HV battery 24 and the EDS 38. In addition, reducing energy used from the onboard charging system 12 increases the electric-only driving range of the vehicle 10 since there is more electric energy available from the HV battery 24 and/or the EDS 38 to propel the vehicle 10 from one location to another.

At block 70, a time that the vehicle 10 is predicted to be in an off state is determined. The off state of the vehicle 10 refers to when the engine 22 is switched off or no longer running and the vehicle 10 is not in a drive mode. The power controller 44 either alone or in combination with the VSC/PCM 48 and/or BCM 46 may be used to determine the time that the vehicle 10 is predicted to be in the off state. The time that the vehicle 10 is predicted to be in an off state may be determined based on how long the vehicle 10 was not driven between prior driving cycles of the vehicle 10. Thus, the controller 42 may learn or empirically determine how long the vehicle 10 will be not commanding electric power from the auxiliary battery 20 to drive low-voltage loads in the vehicle 10. Likewise, the time that the vehicle 10 is predicted to be in the off state may be determined based on direct input from the operator of vehicle 10. Thus, the controller 42 may receive information supplied by the operator of vehicle 10 on how long the vehicle 10 will be not commanding electric power from the auxiliary battery 20 to drive low-voltage loads in the vehicle 10. Such information input may be in the form of a human machine interface (not shown).

With continuing reference to block 70, the time that the vehicle 10 is predicted to be in the off state may be used to determine a lowest acceptable charge level for the auxiliary battery 20. The lowest acceptable charge level may be defined as the lowest charge level of the auxiliary battery 20 at the time the vehicle 10 is switched from an on state to the off state that allows the auxiliary battery 20 to operate the controller 42 and other vehicle components even after the time the vehicle 10 is in the off state. For example, the lowest acceptable charge level may be a predetermined 30-day charge level that allows the auxiliary battery 20 to operate the controller 42 and other vehicle components after 30-days of inactivity of the vehicle 10 without substantial power depletion in the auxiliary battery 20.

At block 72, a predicted time until next charge of the auxiliary battery 20 is determined. The power controller 44 either alone or in combination with the VSC/PCM 48 and/or BCM 46 may be used to empirically determine the predicted time until next charge of the auxiliary battery 20. The predicted time until next charge can be based on when the onboard charging system 12 is predicted to provide power for charging the auxiliary battery 20 or when the auxiliary battery 20 is predicted to be charged with power from the external power source 14.

At block 74, a lower charge level for the auxiliary battery 20 is determined. The lower charge level may be either substantially similar to a lower level of the predetermined operating range 21 of charge levels or less than the predetermined operating range 21 of the auxiliary battery 20. For example, the lower charge level may be the lowest acceptable charge level for the auxiliary battery 20. The power controller 44 either alone or in combination with the VSC/PCM 48 and/or BCM 46 may be used to determine the lower charge level. For example, the power controller 44 may determine the lower charge level based on the predicted time until next charge. Likewise, the power controller 44 may determine the lower charge level based on the time that the vehicle 10 is predicted to be in the off state.

At block 76, the auxiliary battery 20 is allowed to discharge to the lower charge level during the drive mode of the vehicle 10. Allowing the auxiliary battery 20 to discharge may include allowing the auxiliary battery 20 to obtain the lower charge level while limiting or minimizing energy usage from the onboard charging system 12 to charge the auxiliary battery 20. For example, the auxiliary battery 20 may discharge to the lower charge level without the onboard charging system 12 recharging the auxiliary battery 20 while the vehicle 10 is in the drive mode. In such an example, the auxiliary battery 20 may discharge from the upper charge level to the lower charge level without recharging the auxiliary battery 20. Allowing the auxiliary battery 20 to obtain the lower charge level while limiting use the onboard charging system 12 to charge the auxiliary battery 20 can increase the electric-only driving range of the vehicle 10.

At block 78, the auxiliary battery 20 is charged using electric power generated from the onboard charging system 12. For example, the engine 22 can drive the electric generator 30 to generate electrical energy, which the EDS 38 can receive and distribute to the onboard charging system 12 for charging the auxiliary battery 20. The onboard charging system 12 can charge the auxiliary battery 20 to an intermediate charge level that is within the predetermined operating range 21 of charge levels of the auxiliary battery 20.

FIG. 3 illustrates a charge level diagram 80 illustrating charge levels of the auxiliary battery 20 during a number of time intervals 82, 84, 86, 88, 90.

During time interval 82 of the charge level diagram 80, the auxiliary battery 20 is charged using power from the external power source 14. For example, the auxiliary battery 20 may be charged from a charge level of about 20 to an upper charge level of about 115, which may be greater than the predetermined operating range 21 of the auxiliary battery 20. As shown, the controller 42 and/or power controller 44 may maintain the auxiliary battery 20 at the upper charge level when the auxiliary battery 20 achieves the upper charge level.

During time interval 84, the vehicle 10 operates in the drive mode and the auxiliary battery 20 is allowed to discharge from the upper charge level through the predetermined operating range 21 of charge levels, and to a lower charge level that may be less than the predetermined operating range 21 of charge levels. For example, the lower charge level may be a charge level of about −15 relative to the scale of charge levels from 0 to 100 for the auxiliary battery 20.

During time interval 86, neither the external power source 14 nor the onboard charging system 12 charges the auxiliary battery 20 to a greater charge level than the lower charge level. However, the onboard charging system 12 may maintain the auxiliary battery 20 at the lower charge level depending on the amount of electric charge that the lower charge level represents for the auxiliary battery 20.

During time interval 88, the auxiliary battery 20 is charged using electric power generated from the onboard charging system 12. The engine 22 may provide electric power either directly or indirectly to the onboard charging system 12 for charging the auxiliary battery 20. Alternatively, regenerative braking energy may be used to charge the auxiliary battery 20. As shown, the auxiliary battery 20 is charged from the lower charge level and into the predetermined operating range 21 until the auxiliary battery 20 achieves an intermediate charge level.

During time interval 90, the auxiliary battery 20 is charged using the external power source 14 to a charge level above the predetermined operating range 21 of charge levels of the auxiliary battery 20.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of charging an auxiliary battery in a plug-in electric vehicle including an onboard charging system, the method comprising:
   charging the auxiliary battery to an upper charge level using an external power source thereby reducing energy used from the onboard charging system to charge the auxiliary battery during a drive mode of the vehicle, the upper charge level being at least one of:
      approximately an upper level of a predetermined operating range of charge levels; and
      greater than the predetermined operating range of charge levels;
   allowing the auxiliary battery to discharge to a lower charge level during the drive mode of the vehicle, the lower charge level being at least one of:
      approximately a lower level of the predetermined operating range of charge levels; and
      less than the predetermined operating range of charge levels;
   wherein the lower charge level is based on a time that the vehicle is predicted to be in an off state.

2. The method of claim 1 further including determining parameters of the auxiliary battery in the vehicle to obtain the predetermined operating range of charge levels.

3. The method of claim 1 wherein the predetermined operating range for the auxiliary battery is a voltage range.

4. The method of claim 3 wherein the voltage range is between 11 volts and 13 volts and the upper charge level is a charge level between 12 volts and 15 volts.

5. The method of claim 1 wherein the upper charge level is a predetermined maximum charge of the auxiliary battery.

6. The method of claim 1 further including charging a high-voltage battery in the vehicle using the external power source while charging the auxiliary battery to the upper charge level.

7. The method of claim 1 further including charging a high-voltage battery in the vehicle to a predetermined charge level before using the external power source to charge the auxiliary battery to the upper charge level.

8. The method of claim 1 wherein allowing the auxiliary battery to discharge includes allowing the auxiliary battery to discharge from the upper charge level to the lower charge level while limiting energy usage from the onboard charging system to charge the auxiliary battery.

9. The method of claim 1 further including determining the lower charge level based on operating parameters of the auxiliary battery.

10. The method of claim 1 further including charging the auxiliary battery to an intermediate charge level within the predetermined operating range of charge levels with power generated from the onboard charging system.

11. A system for charging an auxiliary battery in a plug-in electric vehicle including an onboard charging system, the auxiliary battery having a predetermined operating range of charge levels, the system comprising:
   at least one logic device configured to determine an upper charge level that is at least one of:
      approximately an upper level of the predetermined operating range of charge levels; and
      greater than the predetermined operating range of charge levels; and
   to charge the auxiliary battery to the upper charge level using an external power source; and to allow the auxiliary battery to discharge to a lower charge level during the drive mode of the vehicle, the lower charge level being at least one of:
   approximately a lower level of the predetermined operating range of charge levels; and
   less than the predetermined operating range of charge levels;
wherein the lower charge level is based on a predicted time until next charge of the auxiliary battery.

12. The system of claim 11 wherein the predicted time until next charge is based on when the onboard charging system in the vehicle is predicted to provide power for charging the auxiliary battery.

13. The system of claim 11 wherein the predicted time until next charge is based on when the auxiliary battery is predicted to be charged with power from the external power source.

14. The system of claim 11 wherein the predetermined operating range for the auxiliary battery is a voltage range, the upper and lower charge levels being voltage levels, and the method further including charging a high-voltage battery in the vehicle to a predetermined voltage level before using the external power source to charge the auxiliary battery to the upper charge level.

15. The system of claim 11 wherein the logic device is a controller including a processor operable to execute software instructions, a computer memory operable to store software instructions accessible by the processor, and a set of software instructions stored in the memory to determine the upper charge level and to charge the auxiliary battery to the upper charge level.

16. A method of charging an auxiliary battery in a plug-in electric vehicle including an onboard charging system, the method comprising:
   charging the auxiliary battery to an upper charge level using an external power source; and
   allowing the auxiliary battery to discharge to a lower charge level during the drive mode of the vehicle, the lower charge level being based on a predicted time until next charge of the auxiliary battery.

17. The method of claim 16 wherein the lower charge level being at least one of:
   approximately a lower level of the predetermined operating range of charge levels; and
   less than the predetermined operating range of charge levels.

18. A method of charging an auxiliary battery in a plug-in electric vehicle including an onboard charging system, comprising:
   charging the auxiliary battery to an upper charge level using an external power source; and
   allowing the auxiliary battery to discharge to a lower charge level during the drive mode of the vehicle, the lower charge level being based on a time that the vehicle is predicted to be in an off state.

* * * * *